US011384967B2

(12) United States Patent
Arnedo et al.

(10) Patent No.: US 11,384,967 B2
(45) Date of Patent: Jul. 12, 2022

(54) MULTI POWER CONVERTER UNIT FOR A TRAILER REFRIGERATION UNIT

(71) Applicant: Carrier Corporation, Palm Beach Gardens, FL (US)

(72) Inventors: Luis Arnedo, Glastonbury, CT (US); Veronica Adetola, West Hartford, CT (US)

(73) Assignee: CARRIER CORPORATION, Palm Beach Gardens, FL (US)

(*) Notice: Subject to any disclaimer, the term of this patent is extended or adjusted under 35 U.S.C. 154(b) by 0 days.

(21) Appl. No.: 16/753,012

(22) PCT Filed: Oct. 4, 2018

(86) PCT No.: PCT/US2018/054355
§ 371 (c)(1),
(2) Date: Apr. 2, 2020

(87) PCT Pub. No.: WO2019/070968
PCT Pub. Date: Apr. 11, 2019

(65) Prior Publication Data
US 2020/0232686 A1 Jul. 23, 2020

Related U.S. Application Data

(60) Provisional application No. 62/568,476, filed on Oct. 5, 2017.

(51) Int. Cl.
F25B 27/00 (2006.01)
F25D 29/00 (2006.01)
(Continued)

(52) U.S. Cl.
CPC ............ F25B 27/00 (2013.01); F25D 29/003 (2013.01); B60H 1/00428 (2013.01); B60H 1/3232 (2013.01); F25B 2327/001 (2013.01); F25B 2600/0253 (2013.01); F25D 11/003 (2013.01)

(58) Field of Classification Search
CPC ............... F25B 27/00; F25B 2327/001; F25B 2600/0253; F25D 29/003; F25D 11/003; B60H 1/00428; B60H 1/3232
See application file for complete search history.

(56) References Cited

U.S. PATENT DOCUMENTS 7,854,278 B2 12/2010 Kaufman
8,373,303 B1 2/2013 Daniels et al.
(Continued)

FOREIGN PATENT DOCUMENTS

EP 1790921 A1 5/2007
JP 2002323280 A 11/2002
(Continued)

OTHER PUBLICATIONS

International Search Report/Written Opinion for International Application No. PCT/2018/054355; International Filing Date: Oct. 4, 2018; dated Dec. 19, 2018, 13 pages.

Primary Examiner — Tavia Sullens
(74) Attorney, Agent, or Firm — Cantor Colburn LLP

(57) ABSTRACT

A trailer refrigeration unit is provided. Aspects include a plurality of power sources, wherein the plurality power sources are selectively coupled to a power converter and at least one compressor. The power converter is coupled to at least one fan and is selectively coupled to the at least one compressor. A microcontroller circuit is included and is configured to selectively operate the trailer refrigeration unit in one of a plurality of modes based on an environmental parameter within the trailer refrigeration unit. The plurality of modes includes a first mode where the at least one compressor and at least one fan are powered by the power converter and a second mode where the at least one compressor is powered by at least one of the plurality of power sources.

4 Claims, 3 Drawing Sheets

(51) Int. Cl.
*B60H 1/00* (2006.01)
*B60H 1/32* (2006.01)
*F25D 11/00* (2006.01)

(56) References Cited

U.S. PATENT DOCUMENTS

| | | |
|---|---|---|
| 8,776,928 B2 | 7/2014 | Stover, Jr. et al. |
| 8,863,540 B2 | 10/2014 | Alston et al. |
| 9,172,249 B2 | 10/2015 | Rockenfeller et al. |
| 9,528,697 B2 | 12/2016 | Sonnervig et al. |
| 9,531,247 B2 | 12/2016 | Kuznetsov |
| 2009/0314019 A1* | 12/2009 | Fujimoto ............ B60H 1/3232 62/228.5 |
| 2010/0045105 A1 | 2/2010 | Bovio et al. |
| 2010/0229581 A1* | 9/2010 | Truckenbrod ..... B60H 1/00428 62/236 |
| 2014/0026599 A1* | 1/2014 | Rusignuolo ........ B60H 1/00428 62/56 |
| 2014/0285123 A1 | 9/2014 | Tomlinson |
| 2014/0375272 A1 | 12/2014 | Johnsen et al. |
| 2015/0040598 A1 | 2/2015 | Steele et al. |
| 2015/0121923 A1 | 5/2015 | Rusignuolo et al. |

FOREIGN PATENT DOCUMENTS

| | | |
|---|---|---|
| WO | 20100104960 A1 | 9/2010 |
| WO | 2016038838 A1 | 3/2016 |
| WO | 2017066307 A1 | 4/2017 |

\* cited by examiner

MULTI POWER CONVERTER UNIT FOR A TRAILER REFRIGERATION UNIT

CROSS REFERENCE TO RELATED APPLICATIONS

This application is a National Stage application of PCT/US2018/054355, filed Oct. 4, 2018, which claims the benefit of U.S. Provisional Patent Application No. 62/568,476, filed Oct. 5, 2017, both of which are incorporated by reference in their entirety herein.

BACKGROUND

Exemplary embodiments pertain to the art of power converters and more particularly to a multi power converter unit for trailer refrigeration units.

Trailer refrigeration units (TRUs) are containers designed to carry perishable freight at a specific temperature or within a temperature range. TRUs can be equipped with a variety of refrigeration systems for maintaining a specific temperature within the cabin. Typically, a diesel engine driven trailer refrigeration unit is utilized for keeping fresh, frozen foods and other goods during transport. However, problems exist with these diesel engine TRUs such as, for example, fuel costs, harmful exhaust emissions, particular matter, and noise pollution. To address the above problems, electric TRUs are utilized. However, the electric TRUs lack flexibility to add other cleaner power sources such as solar or power take off from the engine, and/or energy storage (e.g., batteries). In addition, mechanical devices are used for part load operation which has a negative impact on efficiency.

BRIEF DESCRIPTION

According to one embodiment, a trailer refrigeration unit is provided. The trailer refrigeration unit includes a plurality of power sources, wherein the plurality power sources are selectively coupled to a power converter and at least one compressor. The power converter is coupled to at least one fan and is selectively coupled to the at least one compressor. A microcontroller circuit is included and is configured to selectively operate the trailer refrigeration unit in one of a plurality of modes based on an environmental parameter within the trailer refrigeration unit. The plurality of modes includes a first mode where the at least one compressor and at least one fan are powered by the power converter and a second mode where the at least one compressor is powered by at least one of the plurality of power sources.

In addition to one or more of the features described above, or as an alternative, further embodiments of the trailer refrigeration unit may include at least one sensor adapted to determine the environmental parameter within the trailer refrigeration unit.

In addition to one or more of the features described above, or as an alternative, further embodiments of the trailer refrigeration unit may include that at least one of the plurality of power sources is a diesel generator.

In addition to one or more of the features described above, or as an alternative, further embodiments of the trailer refrigeration unit may include that at least one of the plurality of power sources is an onboard diesel engine.

In addition to one or more of the features described above, or as an alternative, further embodiments of the trailer refrigeration unit may include that at least one of the plurality of power sources is a mains power supply.

In addition to one or more of the features described above, or as an alternative, further embodiments of the trailer refrigeration unit may include that at least one of the plurality of power sources is an axle generator.

In addition to one or more of the features described above, or as an alternative, further embodiments of the trailer refrigeration unit may include at least one battery coupled to the power converter.

In addition to one or more of the features described above, or as an alternative, further embodiments of the trailer refrigeration unit may include that the power converter comprises at least one alternating current to direct current converter, at least one direct current to direct current converter, and at least one direct current to alternating current converter.

According to one embodiment, a refrigeration system is provided. The refrigeration system includes a refrigeration unit including at least one compressor, an evaporator, a plurality of power sources, and at least one fan operable to move air towards the evaporator. The plurality of power sources are selectively coupled to a power converter and the at least one compressor. The power converter is coupled to the at least one fan and is selectively coupled to the at least one compressor. A microcontroller circuit is included and is configured to selectively operate the trailer refrigeration unit in one of a plurality of modes based on an environmental parameter within the trailer refrigeration unit. The plurality of modes includes a first mode where the at least one compressor and at least one fan are powered by the power converter and a second mode where the at least one compressor is powered by at least one of the plurality of power sources.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
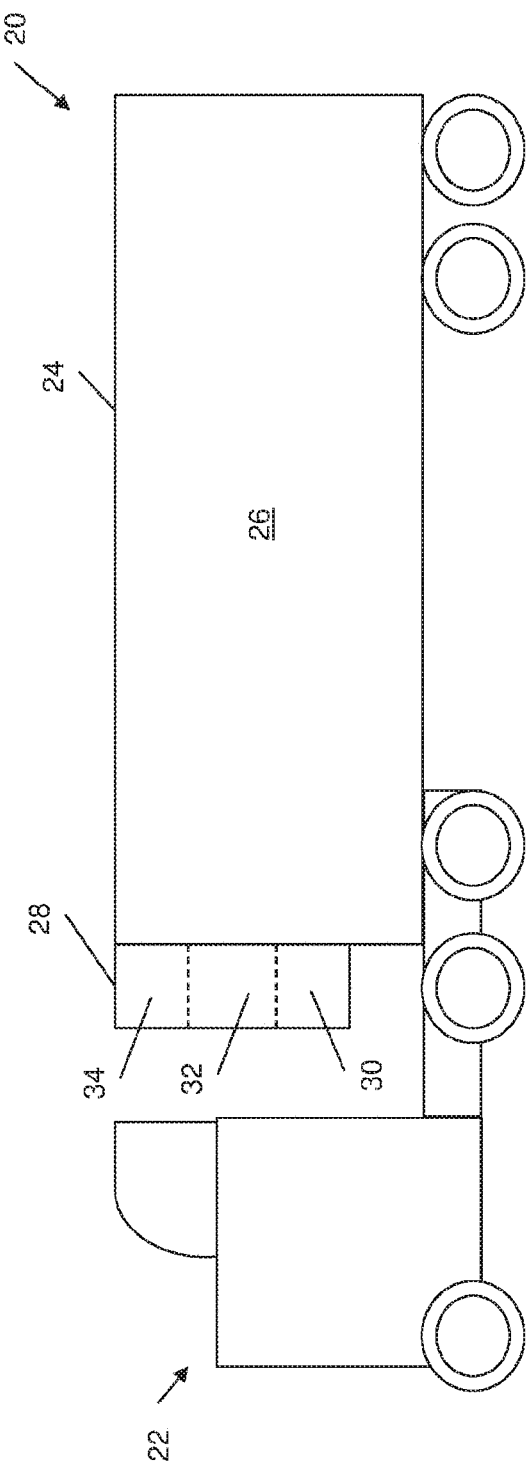
FIG. 1 depicts a transport refrigeration unit in an exemplary embodiment.

FIG. 1 shows a transport refrigeration system 20 having a refrigerated trailer. The trailer may be pulled by a tractor 22. The exemplary trailer includes a container 24 defining an interior compartment 26. It is understood that embodiments described herein may be applied to shipping containers that are shipped by rail or sea, without use of a tractor 22. An equipment housing 28 mounted to a front of the container 24 may contain an electric generator system including an internal combustion engine 30 (e.g., compression ignition/diesel) and an electric generator 32 mechanically coupled to the engine 30 to be driven thereby. A refrigeration system 34 may be electrically coupled to the generator 32 to receive electrical power. Refrigeration system 34 includes a compressor, condenser, expansion valve and one or more evaporators defining a refrigeration circuit for circulating a refrigerant, as known in the art. Refrigeration system 34 also includes one or more fans, such as a condenser fan, evaporator fan or ventilation fan. Embodiments of the invention described herein power one or more fans (such as a condenser fan, evaporator fan and/or ventilation fan) using direct current (DC).

Trailer refrigeration units (TRUs) typically utilize a diesel generator as a power source to accommodate refrigeration loads. Given some of the drawbacks of diesel generators, some approaches have been to utilize more electric TRUs. However, this approach lacks the flexibility to add other cleaner power sources such as solar or power take off from the engine and/or energy storage such as batteries. In addition, the compressor speed in the refrigeration system cannot be continuously controlled to match cooling loads so mechanical devices are often used for part load control which can have an impact on efficiency. The part-load efficiency refers to a system's ability to handle part-load energy use in a refrigeration system. These refrigeration systems generally operate at peak efficiency when they are working at their maximum capacity and most systems are sized to meet cooling conditions that occur sparingly. Because of this, refrigeration systems are often oversized to meet full load demand. However, the full load is rarely needed in practice compared to the time the system operates at less than full load.

Figure 2:
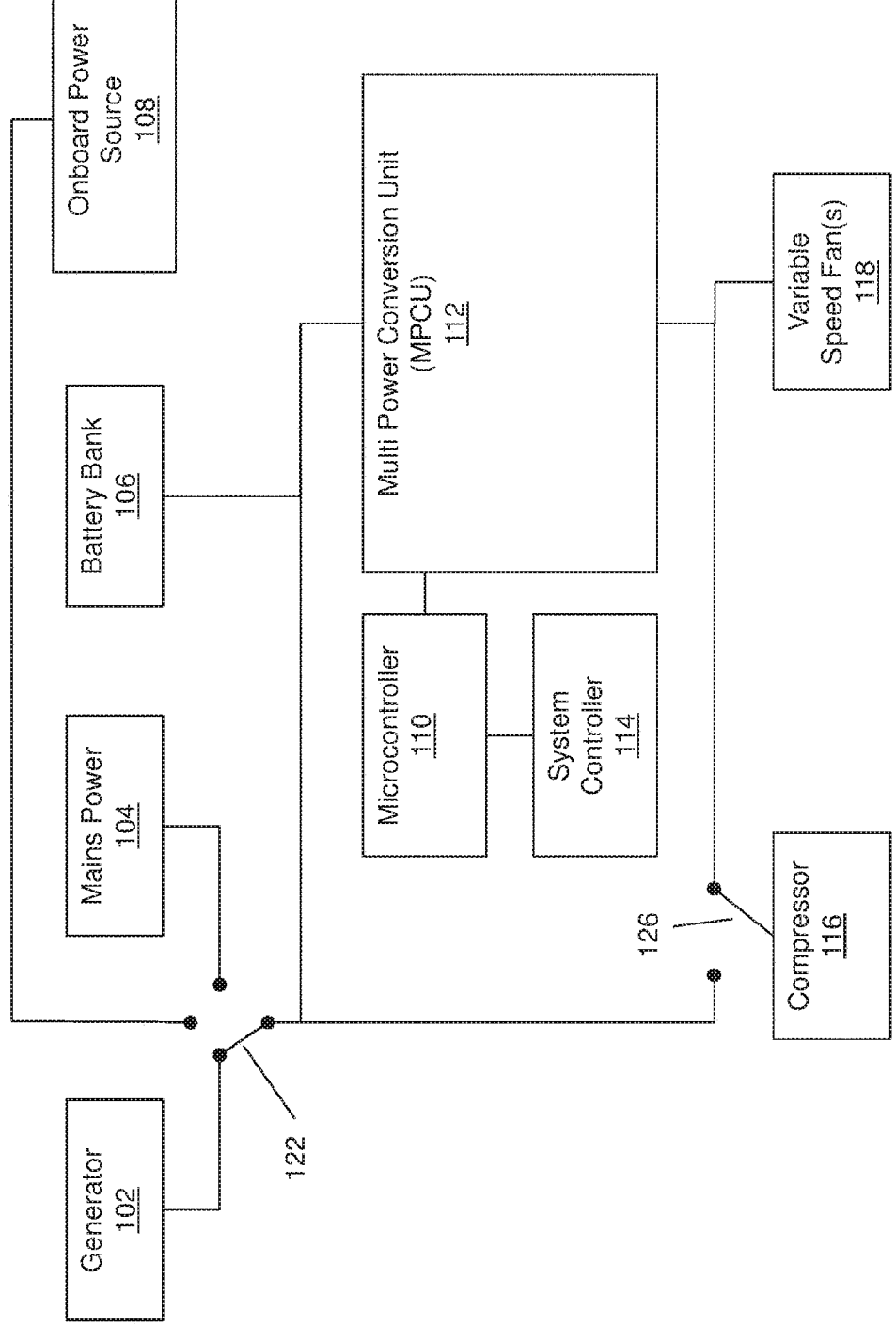
FIG. 2 depicts a transport refrigeration unit power system according to one or more embodiments.

FIG. 2 depicts a transport refrigeration unit power system according to one or more embodiments. The transport refrigeration unit power system 200 includes a multi power conversion unit (MPCU) 112, a micro controller 110, a system controller 114, a compressor 116, and at least one variable speed fan 118. The MPCU 112 is electronically coupled to a battery bank 106 and the at least one variable speed fan 118. The MPCU 112 is selectively coupled to at least one compressor 116 by switch 126. The MPCU is also selectively coupled to a generator 102, a mains power 104, and an onboard power source 108 by switch 122. The microcontroller 110 can operate switch 122 and switch 126. The system controller 114 is in electronic communication with the microcontroller 110 and can be located within the TRU or be located outside the TRU. The system controller 114 can receive environmental parameters (e.g., environmental data such as temperature inside the TRU) from one or more sensors. The sensors can be any type of sensors such as, for example, temperature sensors or humidity sensors. The environmental parameters received by the system controller 114 can be used to dictate operation of the TRU power system 200. For example, if the temperature is remaining within a specified range, the system controller 114 can direct the microcontroller 110 to operate the MPCU 112 in a temperature control mode. If the temperature is elevated, the system controller 114 can direct the microcontroller 110 to engage the compressor 116 to reduce the temperature inside the TRU.

In one or more embodiments, the MPCU 112 is a power converter that can includes an alternating current (AC) to direct current (DC) converter. The AC to DC converter can be any type of converter such as a passive rectifier or an active rectifier. The MPCU 112 also can include a DC to AC converter such as a power inverter, for example. Also, the MPCU 112 can include a DC to DC converter such as a voltage regulator or linear regulator, for example. The MPCU inputs could be a passive rectifier or an active rectifier, the interface to the battery bank 106 can be a bidirectional DC to DC converter, and the interface to the at least one compressor 116 and the at least one fan 118 can be an integrated variable speed drive. A DC link capacitor bank is shared for all the inputs and output converters and the DC link voltage is controlled by a battery charger converter, by doing this the power flow of the sources, loads, and energy storage can be indirectly controlled. When multiple loads and sources are interfaced by power electronics converters that share the same DC link capacitor bank the power flow equation seen from the DC link terminals can be written as follows:

$$P_{dc\_Link} = P_{out\_load1} + P_{out\_load2} + P_{out\_loadn} + P_{in\_source\_1} + P_{in\_source2} + P_{in\_source\_n} + P_{\_batt}$$

If there is a mismatch between power input, power output, and power that goes to the batteries, then $P_{dc\_Link}$ could be negative (Dc link capacitor discharging & DC_link voltage decreases) or could be positive (Dc link capacitor charging & DC_link voltage increases). Hence, the DC link voltage contains information about the power flow in the system that can be used to control the battery charger converter to charge or discharge the battery to keep the power balance between generation and consumption.

The battery charger converter controls have an outer loop voltage regulator that control the DC link voltage around a given reference voltage. A mismatch between the reference and the feedback will produce a reference current to an inner current loop regulator that controls the current going in or out of the battery. An inner current loop regulator is featured with a dynamic current limit for charging or discharging the battery that receive the limits from a supervisory controller (SC) or a battery management system (BMS) which also includes an additional current reference that could be used by an SC or BMS to keep the battery state of charge around desired value.

In addition the MPCU can include an accelerometer and a gyroscope. This is especially useful when using the power take off from the engine (i.e., onboard power source 108) or power take off from the trailer wheel shaft utilizing an axle generator. An accelerometer and a gyroscope can be used to estimate the truck driving conditions so that the MPCU can decide to charge the batteries when the truck is going downhill or deaccelerating to harvest the truck's kinetic energy and not charge the battery when the truck is going uphill or accelerating.

In one or more embodiments, the multi power converter unit 112 is a +/− power electronic converter that allows integration of various power sources and energy storage independently from their capacity to generate power or its internal dynamics. The MPCU allows transfer of power from the various sources to the load. At the same time, the MPCU 112 can be used to interface a battery and control the compressor rotational speed to match cooling requirements avoiding the need for inefficient mechanical part load control devices. The MPCU incorporates all the power electronics components sensors and control algorithms of a variable speed drive. Hence, the MPCU 112 can control the motor speed of the compressor 116 by changing the voltage and frequency applied to the electric motor mechanically coupled to the at least one compressor 116. As discussed above, refrigeration systems are often oversized to meet full load demand when full load is indicative of a compressor 116 during pull down. The at least one compressor 116 may have a range of operating frequencies, for example, from 35 Hz (such as for startup and minimal cooling needs) to 100 Hz (pull down) for delivering the highest compressor shaft speed and thus a highest rate of cooling.

In one or more embodiments, the TRU power system 200 includes at least two modes of operation. The first mode of operation is during pull down by the compressor 116 where the power demand from the compressor 116 is the highest. During the first mode of operation, the microcontroller 110, utilizing switch 122 and switch 126, controls the pull down to come from either the generator 102, the onboard power source 108, or, if available, the mains power 104. The second mode of operation is during temperature control which requires a lower power requirement. In second mode, the microcontroller 110, utilizing switch 126, routes power to the compressor 116 through the MPCU 112. By pulling power, during pull down, from a power source other than the MPCU 112, the MPCU 112 cost can be driven down due to reducing sizing requirements and efficiency can improve for the system. For example, an MPCU can be sized at 25% or 50% of the maximum load requirement because of the pull down is being handled directly by another power source. This effectively reduces the range of power needed to be drawn from the MPCU 112. This also allows for additional power sources to be used with the MPCU 112 such as the battery bank 106. In other embodiments, power sources such as solar panels can be utilized in addition or in lieu of the battery bank 106.

In one or more embodiments, the MPCU 112 is a multi-port power electronics converter that incorporates all the components, sensors and control algorithms to interface multiple DC or AC sources, also it can interface multiple loads such as, for example, at least one compressor 116 and at least one variable speed fan 118. The MPCU 112 can provide variable voltage and variable frequency to the compressor and fans to control independently their rotational speed. By controlling the compressors and fans speed the system can match cooling loads, avoiding the need to use methods that reduces significantly the system efficiency such as on-off control or refrigerant by-pass valves.

Figure 3:
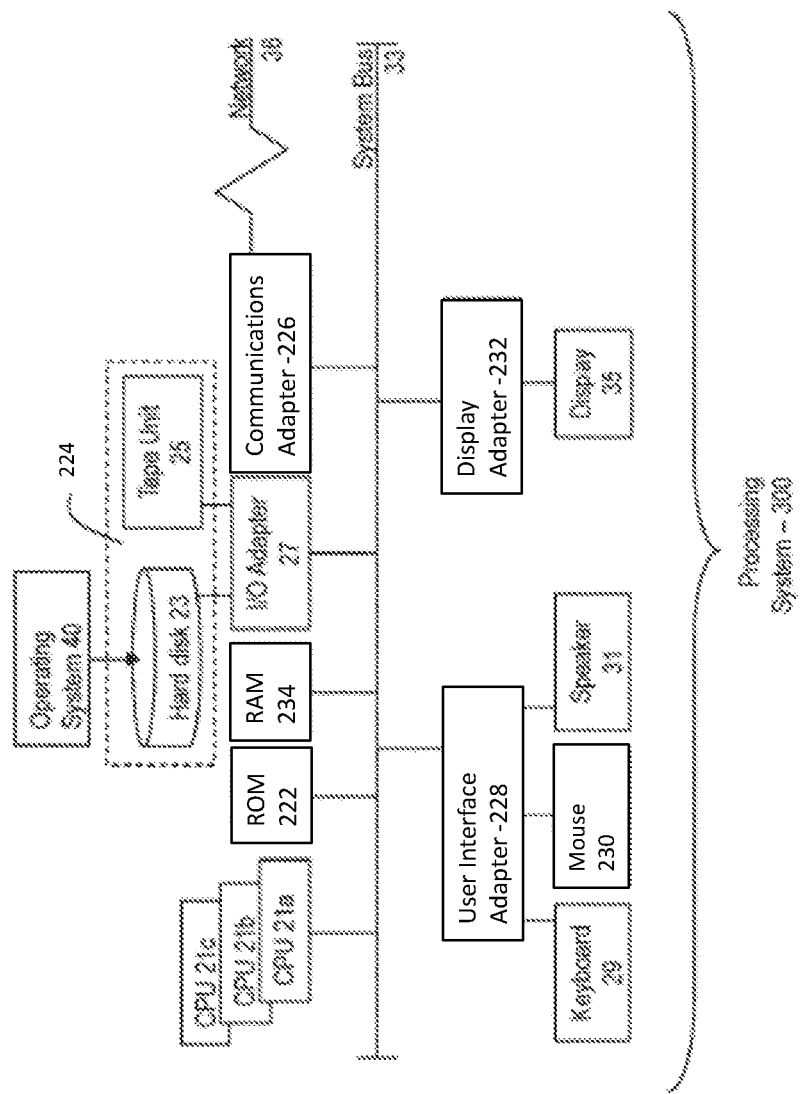
FIG. 3 depicts a block diagram of a computer system for use in implementing one or more embodiments.

Referring to FIG. 3, there is shown an embodiment of a processing system 300 for implementing the teachings herein. In this embodiment, the system 300 has one or more central processing units (processors) 21a, 21b, 21c, etc. (collectively or generically referred to as processor(s) 21). In one or more embodiments, each processor 21 may include a reduced instruction set computer (RISC) microprocessor. Processors 21 are coupled to system memory 234 and various other components via a system bus 33. Read only memory (ROM) 222 is coupled to the system bus 33 and may include a basic input/output system (BIOS), which controls certain basic functions of system 300.

FIG. 3 further depicts an input/output (I/O) adapter 27 and a network adapter 226 coupled to the system bus 33. I/O adapter 27 may be a small computer system interface (SCSI) adapter that communicates with a hard disk 23 and/or tape storage drive 25 or any other similar component I/O adapter 27, hard disk 23, and tape storage device 25 are collectively referred to herein as mass storage 224. Operating system 40 for execution on the processing system 300 may be stored in mass storage 224. A network adapter 226 interconnects bus 33 with an outside network 36, such as wireless networking or Wi-Fi, enabling data processing system 300 to communicate with other such systems. A screen (e.g., a display monitor) 35 is connected to system bus 33 by display adaptor 232, which may include a graphics adapter to improve the performance of graphics intensive applications and a video controller. In one embodiment, adapters 27, 226, and 232 may be connected to one or more I/O busses that are connected to system bus 33 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 33 via user interface adapter 228 and display adapter 232. A keyboard 29, mouse 230, and speaker 31 all interconnected to bus 33 via user interface adapter 228, which may include, for example, a Super I/O chip integrating multiple device adapters into a single integrated circuit.

In exemplary embodiments, the processing system 300 can interface with the sensors described above and others sensors such as, for example, environmental sensors, gyroscopes, accelerometers, global positioning systems (GPS), and the like.

Thus, as configured in FIG. 3, the system 300 includes processing capability in the form of processors 21, storage capability including system memory 234 and mass storage 224, input means such as keyboard 29 and mouse 230, and output capability including speaker 31 and display 35. In one embodiment, a portion of system memory 234 and mass storage 224 collectively store an operating system coordinate the functions of the various components shown in FIG. 3.

In one or more embodiments, the microcontroller 110 and system controller 114 can be implemented utilizing the system 300 in FIG. 3. The microcontroller 110 and system controller 114 can be communicatively coupled to sensors taking sensors readings about the trailer refrigeration system and/or the motor (or rail) vehicle moving the trailer.

A detailed description of one or more embodiments of the disclosed apparatus are presented herein by way of exemplification and not limitation with reference to the Figures.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

The invention claimed is:

1. A trailer refrigeration unit comprising:
   a plurality of power sources including a generator and mains power;
   a power converter and at least one compressor;
   wherein the power converter is coupled to at least one fan;
   a first switch for selectively connecting to one of the generator and the mains power;

a second switch for selectively connecting the at least one compressor to one of the first switch and the power converter; and a microcontroller circuit, wherein the microcontroller circuit is configured to:

selectively operate the trailer refrigeration unit in one of a plurality of modes based on an environmental parameter within the trailer refrigeration unit, wherein the plurality of modes includes:

a first mode where the at least one compressor is powered by one of the generator and the mains power by connecting the second switch to the first switch in electrical series in the first mode, and a second mode where the at least one compressor is powered by the power converter by connecting the second switch to the power converter, the first switch, the power converter and the second switch in electrical series in the second mode.

2. The trailer refrigeration unit of claim 1 further comprising at least one sensor adapted to determine the environmental parameter within the trailer refrigeration unit.

3. The trailer refrigeration unit of claim 1 further comprising at least one battery coupled to the power converter.

4. The trailer refrigeration unit of claim 1, wherein the power converter comprises:

at least one alternating current to direct current converter;
at least one direct current to direct current converter; and
at least one direct current to alternating current converter.

* * * * *